United States Patent [19]
Tsuzuki et al.

[11] Patent Number: 5,398,235
[45] Date of Patent: Mar. 14, 1995

[54] CELL EXCHANGING APPARATUS

[75] Inventors: Munenori Tsuzuki; Hideaki Yamanaka; Hirotaka Saito; Hirotoshi Yamada; Kazuyoshi Oshima, all of Kamakura, Japan

[73] Assignee: Mitsubishi Denki Kabushiki Kaisha, Tokyo, Japan

[21] Appl. No.: 20,795

[22] Filed: Feb. 22, 1993

Related U.S. Application Data

[63] Continuation-in-part of Ser. No. 975,104, Nov. 12, 1992.

[30] Foreign Application Priority Data

Nov. 15, 1991 [JP] Japan .................................. 3-300476
Feb. 24, 1992 [JP] Japan .................................. 4-36189

[51] Int. Cl.[6] .................................................. H04J 3/14
[52] U.S. Cl. .................................... 370/16; 370/60; 370/94.1; 340/827; 371/8.1
[58] Field of Search ...................... 370/16, 60, 94.1; 340/827; 371/8.1

[56] References Cited

U.S. PATENT DOCUMENTS

| | | | |
|---|---|---|---|
| 4,603,416 | 7/1986 | Servel et al. | 370/60 |
| 4,692,894 | 9/1987 | Bemis | 364/900 |
| 4,730,305 | 3/1988 | Acampora et al. | 370/60 |
| 4,821,259 | 4/1989 | DeBruler et al. | 370/60 |
| 4,849,968 | 7/1989 | Turner | 370/94 |
| 4,851,991 | 7/1989 | Rubinfeld et al. | 364/200 |
| 4,920,534 | 4/1990 | Adelmann et al. | 370/94.1 |
| 4,935,922 | 6/1990 | Wicklund et al. | 370/60 |
| 4,949,301 | 8/1990 | Joshi et al. | 364/900 |
| 4,956,839 | 9/1990 | Torii et al. | 370/60 |
| 4,993,018 | 2/1991 | Hajikano et al. | 370/60 |
| 5,046,064 | 9/1991 | Suzuki et al. | 370/60 |
| 5,072,440 | 12/1991 | Isono et al. | 370/60 |
| 5,128,931 | 7/1992 | Yamanaka et al. | |
| 5,153,578 | 10/1992 | Izawa et al. | 370/16 X |
| 5,222,085 | 6/1993 | Newman | 370/60 |

FOREIGN PATENT DOCUMENTS

| | | | |
|---|---|---|---|
| 0279443 | 8/1988 | European Pat. Off. | H04L 11/20 |
| 0292962 | 11/1988 | European Pat. Off. | H04L 11/20 |
| 0299473 | 1/1989 | European Pat. Off. | H04L 11/20 |

(List continued on next page.)

OTHER PUBLICATIONS

J. Y. Hui et al., "A Broadband Packet Switch for Integrated Transport", IEEE Journal on Selected Areas in Communications, vol. SAC-3, No. 8, Oct. 1987, pp. 1264–1273.

(List continued on next page.)

*Primary Examiner*—Douglas W. Olms
*Assistant Examiner*—Russell W. Blum
*Attorney, Agent, or Firm*—Wolf, Greenfield & Sacks

[57] ABSTRACT

A cell exchanging apparatus which distributes cells input through a plurality of input lines to output lines by destination for output. Without stopping the operation of the cell exchanging apparatus, active and standby cell switches of the cell exchanging apparatus can be changed over. The cell exchanging apparatus comprises a first and second cell switches, input selectors for feeding input cells only to either of the first and second cell switches, and output selectors for outputting cells output from either of the first and second cell switches to an external system. When a change-over is instructed by a system change-over signal, the input selectors start to feed input cells into the cell switch in the standby mode. When detecting completion of cell output operation from the active cell switch, the output selectors select a new active cell switch. Upon detection of completion of cell output operation from the former active cell switch, a controller sends an output permission signal to the new active cell switch. Resultantly, the new active cell switch starts to output cells to the output selectors which then output the cells to an external system.

15 Claims, 13 Drawing Sheets

FOREIGN PATENT DOCUMENTS

| | | | |
|---|---|---|---|
| 0300876 | 1/1989 | European Pat. Off. | H04L 11/20 |
| 0336373 | 10/1989 | European Pat. Off. | H04L 11/20 |
| 0503663 | 9/1992 | European Pat. Off. | H04L 12/56 |
| 62-230138 | 10/1987 | Japan | H04L 11/00 |
| 1286645 | 11/1989 | Japan | H04L 1/22 |
| 117241 | 5/1990 | Japan | H04L 12/56 |
| 2-228146 | 9/1990 | Japan | H04L 12/48 |
| 2-246646 | 10/1990 | Japan | H04L 12/48 |
| 3-26038 | 2/1991 | Japan | H04L 12/48 |
| WO86/02510 | 4/1986 | WIPO | H04L 11/20 |
| WO88/07298 | 9/1988 | WIPO | H04L 11/20 |

OTHER PUBLICATIONS

Y. Sakurai et al., "Large Scale ATM Multi-Stage Switching Network with Shared Buffer Memory Switches".

Y. S. Yeh et al., "The Knockout Switch: A Simple, Modular Architecture for High-Performance Packet Switching".

J.-P. Coudreuse et al., "Prelude: An Asynchronous Time-Division Switched Network".

Y. Tamir et al., "High-Performance Multi-Queue Buffers For VLSI Communication Switches", The 15th Annual Int'l Symposium on Computer Architecture, May 30–Jun. 2, 1988, Honolulu, Hawaii.

K. Oshima et al., "A New ATM Switch Architecture Based on STS-Type Shared Buffering and its LSI Implementation", XIV Int'l Switching Symposium, Yokoham, Japan, Oct. 25–30, 1992.

"A hit-less protection switching method for ATM switch" T. Kurano Autumn meeting of The Institute of Electronics, Info & Comm. Eng. B-486, 1991.

"A study of a hit-less Protection Scheme for ATM Equipment", T. Koyanagi et al., 1991 Autumn Meeting of the Inst. of Elect., Information and Comm. Eng., B-487.

"A Shared Buffer Memory Switch for an ATM Exchange", Kuwahara et al. Proc. of IEEE Int'l Switching Symposium 1987, Mar., 1987, Phoenix, US; pp. 367-372.

Dieudonne et al.; "Switching techniques for asynchronous time division multiplexing (or fast packet switching)", pp. 370-371, para. 6; FIGS. 5, 6.

Fig. 7A

| TIME SLOT | 1 | 2 | 3 | 4 | 5 | 6 | 7 | 8 | 9 |
|---|---|---|---|---|---|---|---|---|---|
| | 1|1 1 | 1|2 1 | 1|1 1 | 1|4 2 | | | | 1|1 8 | 1|3 8 |

Fig. 7B

| TIME SLOT | 1 | 2 | 3 | 4 | 5 | 6 | 7 | 8 | 9 |
|---|---|---|---|---|---|---|---|---|---|
| | 1|1 1 | 1|2 1 | 1|3 1 | 1|4 2 | | | | 1|1 8 | 1|3 8 |

# CELL EXCHANGING APPARATUS

RELATED APPLICATION

This is a continuation-in-part of Ser. No. 07/975,104, filed on Nov. 12, 1992 entitled Cell Exchanging Apparatus. The contents of the parent application is hereby expressly incorporated by reference.

BACKGROUND OF THE INVENTION

1. Field of the Invention

The present invention relates generally to asynchronous transfer mode (ATM) networks and more particularly to a cell exchanging system for relaying cells and exchanging cells at a high speed.

2. Description of the Prior Art

A number of ATM techniques and architectures have been proposed to switch voice data, video data, and other kinds of data. The ATM techniques are designed for use in a digital network such as an integrated services digital network (ISDN). ATM techniques improve the utilization efficiency of transmission in switching by statistical multiplexing of fixed length packets of the data, known as cells, on a broad band transmission line. The architectures for practicing ATM techniques include switching architectures for switching cells through the network.

FIG. 11 is a block diagram showing the change-over system of an ATM switch, which is described in Japanese Patent Lain-Open No. Hei 3-26038. The ATM switch is used to direct cells through the ATM network. As shown in FIG. 11, this ATM switch is provided with two ATM switch systems #1 and #2, which have the same structure. Redundant switch systems are provided to enhance the robustness of the network.

Identical ATM cells are input in parallel to the respective switch systems #1 and #2. These ATM cells are input in parallel to ATM switch buffers 30a and 30b of the ATM switch systems #1 and #2, and each cell is output to an external system after a delay. In order to monitor the number of cells which are stored in the ATM switch buffers 30a and 30b, ATM buffer cell counters 31a and 31b are provided. Each of the ATM buffer cell counters 31a and 32b increments its count value each time an ATM cell is input to the corresponding ATM switch buffer 30a and 30b, and decrements its count value each time an ATM cell is output from the corresponding buffer. In this way, the ATM buffer cell counters 31a and 31b always monitor the number of cells that are stored in the respective ATM switch buffers 30a and 30b.

Systems #1 and #2 are provided with respective difference detectors 33a and 33b, for comparing the count values of the ATM buffer cell counters 31a and 31b. Systems #1 and #2 are also provided with respective dummy cell markers 32a and 32b for writing dummy cells into the ATM switch buffers 30a and 30b, in accordance with the control signals sent from the difference detectors 33a and 33b.

A plurality of ATM switches are disposed at intersections (cross points) of input and output paths so as to form a crossbar type ATM exchanging apparatus.

The operation of the conventional ATM switch systems of FIG. 11 will be explained below with reference to FIGS. 12A-12C, 13A, and 13B. In FIGS. 12A-12C, 13A, and 13B, switch systems #1 (see FIG. 11) functions as the "currently used" system, whereas switch system #2 (see FIG. 11) functions as a "spare" system.

In this illustrative case, each of the ATM switch buffers 30a and 30b stores the same cells "1"-"2", as shown in FIG. 12A. Accordingly, each of the ATM buffer cell counters 31a and 31b has a counter value of "4".

If ATM switch buffer 30b of switch system #2 ceases operating due to some problem, tile contents of the ATM switch buffer 30b are lost, and the count value of the ATM buffer cell counter 31b is reset to "0", as shown in FIG. 12B. Even if the ATM switch of system #1 becomes operational again, a certain amount of time must elapse before switch system #2 may assume the "currently-used" role previously served by switch system #2.

When switch system #2 assumes the "currently-used" role, difference detector 33b (FIG. 11) detects the difference between the count values of the ATM buffer cell counters 31a and 31b. Difference detector 33b causes the dummy cell marker 32b to generate dummy cells (indicated by "0" entries) which are stored in the ATM switch buffer 30b until the difference in count values is eliminated. Dummy cells are, thus, stored until there is no difference between the count values of the ATM buffer cell counters 31a an 31b, and hence the number of cells stored in the ATM switch buffer 30a equals the number of cells stored in the ATM switch buffer 30b.

For example, when cells "3"-"8" are stored in the ATM switch buffer 30a of switch system #1 and only the cell "8" is stored in the ATM switch buffer 30b of switch system #2, as shown in FIG. 12C, the difference between the numbers of cells stored in the respective switch buffers is "5". Hence, five dummy cells (indicated as "0") are generated and stored in the ATM switch buffer cell 30b. Both ATM buffer cell counters 31a and 31b then have a count value of "6".

In this state, switch system #2 begins to operate in the same way as switch system #1. FIG. 13A shows a subsequent state in which the leading four cells in buffers 30a and 30b have been output and in which four new cells have been supplied to the ATM switch buffers. FIG. 13B shows the state in which two additional cells (six cells in total) have been supplied to the ATM switch buffers 30a and 30b and the leading three cells have been removed from the buffers 30a and 30b. In the state shown in FIG. 13A, since the dummy cells remain, switch system #2 cannot function as a "spare" system. In other words, switch system #2 cannot be called upon to assume the role previously served by switch system #1. However, in the state shown in FIG. 13B, since no dummy cells remain, switch system #2 can be changed over to assume the role of system #1.

With the conventional cell exchanging system having the foregoing configuration, one control unit is shared by two switch systems so as to control which of a plurality of ATM systems for outputting cells to the same output path should output a cell. In such a case, the status of cells stored in the switch buffers are the same for the two switch systems. There is however a problem that the control units cannot be doubled.

On the other hand, when a separate control unit is provided for each of the switch systems 1 and 2, there might be a case in which the switch buffers for the ATM switch systems 1 and 2 might store different numbers of cells. In such a case, the systems 1 and 2 cannot be selected optionally.

SUMMARY OF THE INVENTION

It is, therefore, an object of the present invention to provide a cell exchanging apparatus which comprises two independent ATM switch systems and can perform change-over of the switches without duplication of cells and omission of the cells, and to provide a method therefor.

It is a further object of the present invention to provide a cell exchanging apparatus that does not repeat the transmission of cells or omit the transmission of cells during change-over.

In accordance with an embodiment of the present invention, an asynchronous transfer mode (ATM) cell exchanging apparatus distributes input cells to corresponding cell output lines. Each input cell includes a data portion and a header portion. The header portion includes address information that is used to direct the cell to its destination. The cell exchanging apparatus includes a first cell switch for distributing the input cells to a first set of switch output lines in accordance with address information of the header portions of the input cells. The cell exchanging apparatus also includes a second redundant cell switch for distributing the input cells to a second set of switch output lines in accordance with address information of the header portions of the input cells. Both the first and second cell switches generate idle cells when they input cells.

The cell exchanging apparatus further includes a selection mechanism for determining which of the first and second sets of switch output lines is a currently selected switch of output lines that provides cells to the cell output lines. The selection mechanism is switchable between selecting the first set of switch output lines and the second set of switch output lines. The selection mechanism includes a confirmation mechanism for confirming that idle cells are output on each of the currently selected and spare sets of switch output lines before switching selection by the selection mechanism of cells from the currently selected set of switch output lines to the other set of switch output lines.

The first cell switch and/or the second cell switch may be formed by a plurality of unit switches. In addition, the first and second cell switches may include arbitration logic for arbitrating competing requests to output a cell over a switch output line. In accordance with one embodiment, each of the unit switches is provided with an output buffer that temporarily stores the cells to the output. The unit switches request permission to output a cell when a cell is stored in its output buffer. In this embodiment, the arbitration circuit grants permission to one of the unit switches which are connected to a single switch output line and which are requesting permission to output a cell so that only the cell in the unit switch which is granted permission is output to the switch output line. The arbitration circuit instructs one of the unit switches to output an idle cell when no unit switch requests permission to output a cell.

According to another embodiment of the invention, there is provided a cell exchanging apparatus which comprises a first cell switch which distributes cells input through input lines by destinations and a second cell switch which has the same configuration as the first cell switch; one cell switch operates as an active system and the other operates as a standby system. Cells input to the cell exchanging apparatus are fed through input selectors only to the cell switch operating as the active system, and output selectors output cells output from the cell switch as the active system to an external system as output of the cell exchanging apparatus.

To change over the cell switches as the active and standby systems, first the destinations of input cells are changed by the input selectors to the cell switch in the standby mode from the active cell switch. After a check is made to ensure that the active cell switch outputs no significant cells, the cell switch in the standby mode changes to a new active cell switch which then starts to send cells to the output selectors. Thus, the cell switches as the active and standby systems can be changed over.

BRIEF DESCRIPTION OF THE DRAWINGS

The above and other objects, features and advantages of the present invention will become clear from the following description of the preferred embodiments thereof, taken in conjunction with the accompany drawings in which:

FIGS. 7A and 7B are diagrams showing the output timing for the embodiment shown in FIG. 2;

DETAILED DESCRIPTION OF THE PREFERRED EMBODIMENTS

Figure 1:
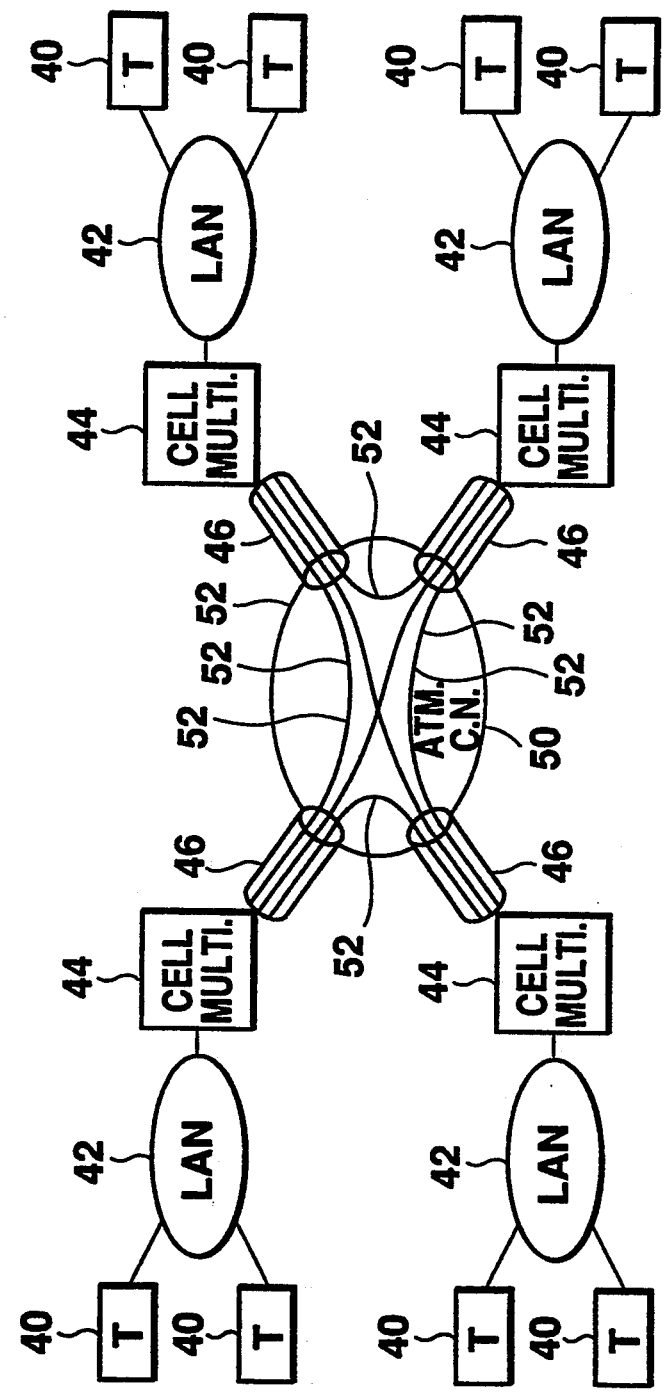
FIG. 1 is a schematic diagram of a digital transmission system in which the ATM cell exchanging apparatus of the present invention may be used.

FIG. 1 shows a digital transmission system in which the cell exchanging apparatus of the present invention may be used. The digital transmission system of FIG. 1 includes an ATM communication network 50. The system also includes terminals 40 that serve as the source and destination of cells that are passed across the network. The terminals are connected to local area networks (LANs) 42, which are, in turn, connected to cell multiplexing devices 44. The cell multiplexing devices 44 serve as interfaces between LANs 42 and the ATM communication network 50. Cells originating from a terminal pass through a LAN 42 to a cell multiplexing device 44, wherein the cells are multiplexed across the ATM communication network 50. Each of the cell multiplexing devices 44 is connected to a number of logical channels 46. The cell multiplexer decides which channel the cells are transmitted across. In making this decision, the cell multiplexing device selects a particular channel 52 that leads to the destination terminal. The cells are demultiplexed by a cell multiplexer device 44 that is coupled to a LAN 42 leading to the destination terminal 40. The demultiplexed cells are then transmitted over the LAN 42 to the destination terminal 40.

Figure 2:
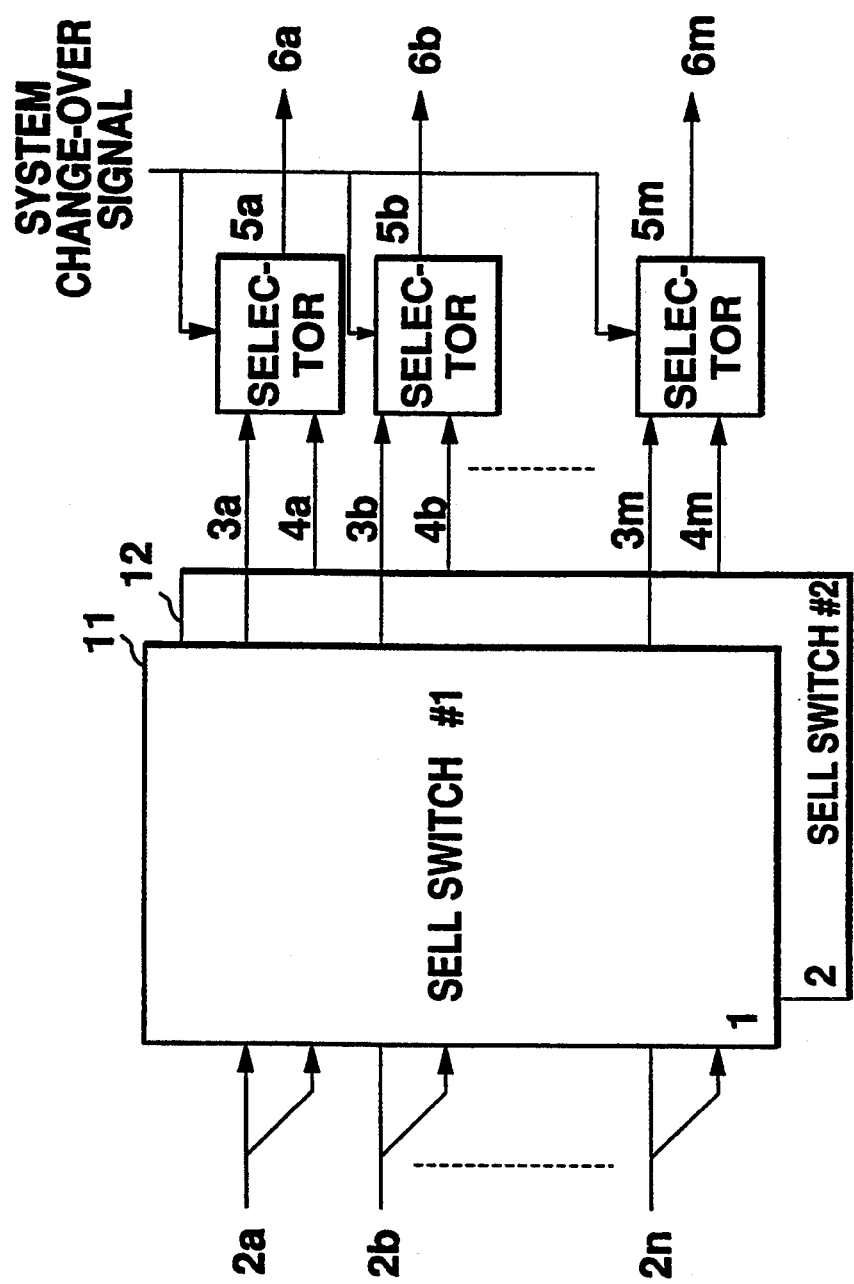
FIG. 2 is a block diagram of the structure of an ATM cell exchanging apparatus according to a first embodiment of the present invention.

The ATM communication network 50 must include a number of switches to properly route cells across the network. The ATM network 50 is designed to operate at very high speeds (e.g., line bit-rates of 155 Mbps). As such, the switching must be done efficiently to maintain a high throughput. The present invention provides a cell exchanging apparatus that performs switching without omitting cells or repeating cells. A first preferred embodiment of a cell exchanging apparatus is shown in FIG. 2. The ATM cell exchanging apparatus of FIG. 2 is provided with a cell switch 11 for receiving cells from a plurality of input lines 2a to 2n (where n is a positive integer) and for outputting the received cells to a plurality of output lines 3a to 3n (where n is a positive integer). A suitable cell switch architecture is described in it. Kuwahara et al., "A Shared Buffer Memory Switch for an ATM Exchange", Proc. of IEEE, 1989. The ATM cell switching apparatus also includes an additional cell switch 12 that serves as a "spare" cell switch. This cell switch 12 has the same structure as cell switch 11 but has separate output lines 4a to 4m. Selectors 5a to 5m are coupled to the output lines 3a–3m and 4a–4m of the respective switches 11 and 12. The selectors 5a–5m select either the output lines 3a to 3m of cell switch 11 or the output lines 4a to 4m of cell switch 12. The selectors 5a to 5m output cells received from the selected lines through lines 6a to 6m. The selectors 5a to 5m make their choice of lines based on the system change-over signal. This signal will be described in more detail below.

Figure 3:
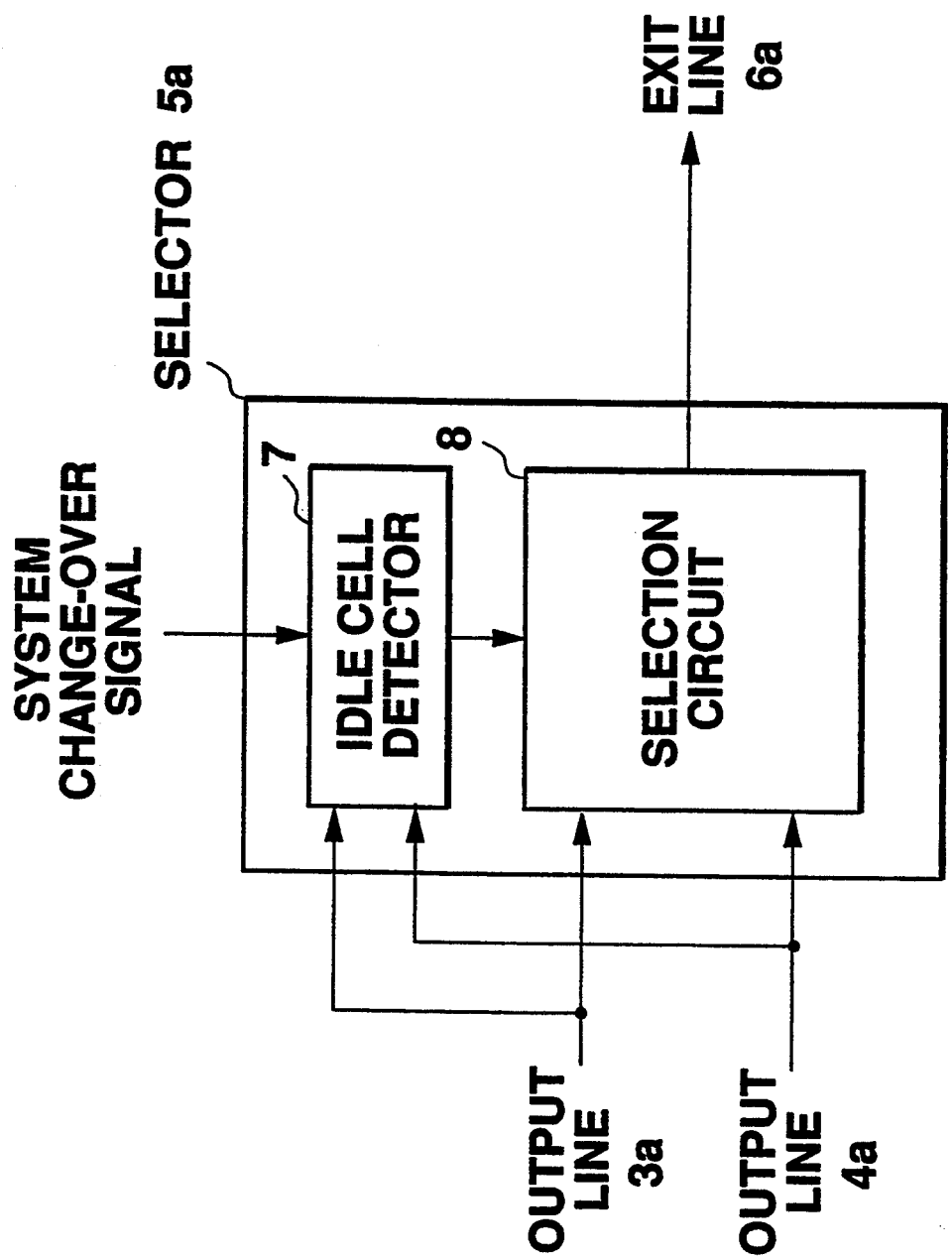
FIG. 3 is a block diagram of the selector 5a shown in FIG. 2.

FIG. 3 is a block diagram of the structure of selector 5a. Each of the other selectors 5b–5m has an identical construction. As shown in FIG. 3, the selector 5a includes an idle cell detector 7, for judging whether or not an idle or idle cell is output on the output lines 3a and 4a. When the cell switch 11 or 12 (FIG. 1) has no cell to output to one of its output lines, an idle cell is output in place of a normal cell. Each cell is typically 53 bytes in length, with 48 bytes of data and 5 bytes of header information. When the cell switch 11 or 12 generates an idle cell, it includes a 2-byte flag in the header information that identifies the cell as an idle cell. The idle cell detector 7 (FIG. 2) constantly monitors the output lines 3a to 4a of the two systems to determine whether any idle cells are output on lines 3a and 4a. The idle cell detector checks for the idle cell flag on incoming cells to determine whether the incoming cells are idle cells.

Figure 4:
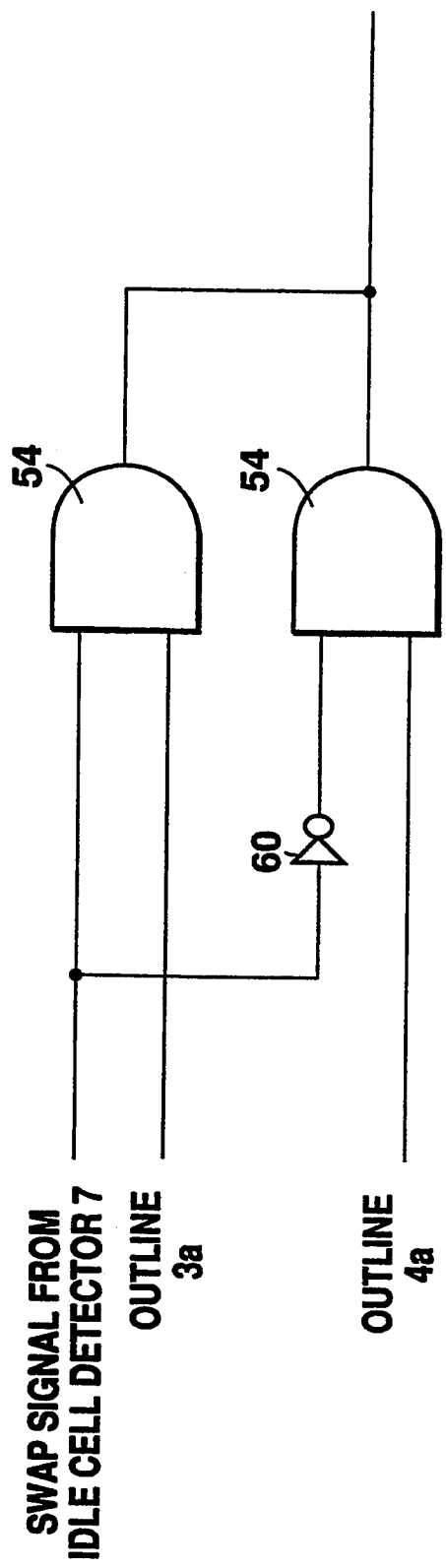
FIG. 4 is a logic diagram of the selection circuit 8 of FIG. 3.

The selector 5a further includes a selection circuit 8, for selecting either output line 3a or 4a and outputting the cell on the selected output line to the line 6a. FIG. 4 provides a more detailed view of one implementation of the selection circuit 8. The selection circuit includes two AND gates 54 and 56 and an inverter 60. If the system change-over signal is generated by an external system in response to a switch failure or any other event, the idle cell detector 7 (FIG. 2) swaps the cell switch from which it selects cells by switching the selection switch 8. Those skilled in the art will know of suitable mechanisms for generating such a system change-over signal. During normal operation, a swap signal sent from the idle cell detector 7 to the selection circuit 8 is high. As such, the cells output on line 3a (see FIG. 4) are passed through AND gate 54. In contrast, the cells output on line 4a are stopped by AND gate 56 because inverter 60 inverts the logically high output of the swap signal. However, when the system change-over signal is generated, the idle cell detector forces the swap signal to a logically low state so that the AND gate 54 stops the cells output on line 3a, whereas AND gate 56 allows the cells output on line 4a to pass.

The switching is performed only after detector 7 (FIG. 3) confirms that an idle cell is output to the output lines 3a and 4a of both systems. The systems are not switched immediately after the system changeover signal is generated but is switched only after an idle is output from both cell switches 11 and 12 to the respective output lines. It is, thus, possible to switch the systems by a very simple circuit structure which neither duplicates nor misses any cells, hence enhancing the throughput of the network.

The operation of this first preferred embodiment will now be explained in detail. In FIG. 2, cell switches 11 and 12 are shown for illustrative purposes as having four input lines 2a to 2d and four output lines 3a to 3d. It is assumed that each cell has a fixed length, and that cells reach the input lines 2a to 2d at substantially random times, provided that the time interval between cells is equivalent to an integral multiple of the length of a cell. In other words, it is assumed that the input phases of the cells are normalized before they reach input lines 2a to 2d and that the cells are input from all the lines in the same phase.

Figure 5:
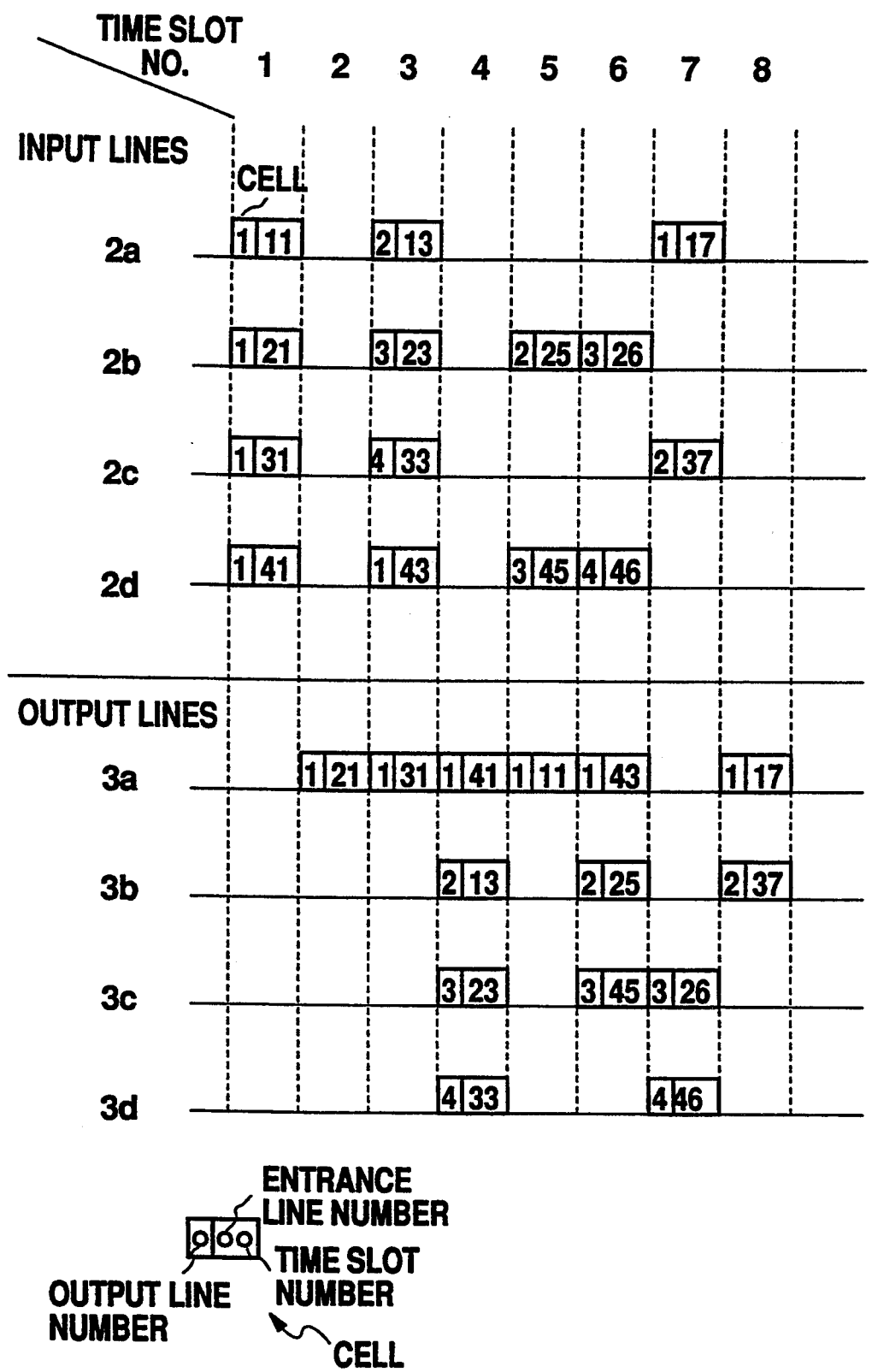
FIG. 5 is a timing diagram showing the input and output timings for the embodiment shown in FIG. 2.

The operation of the cell switch 11 will now be explained. FIG. 5 is a timing chart for signals which are input on the input lines 2a to 2d and output to the output lines 3a to 3d. The numerals provided at the top of the chart represent time slot numbers. Only one cell is input to one input line for each time slot. The numeral at the left portion of each cell represents an output line number, the numeral at the middle portion of each cell represents an input line number, and the number at the right portion of each cell represents a time slot number. The output line numbers 1 to 4 correspond to the output lines 3a to 3d, respectively, and the input line numbers 1 to 4 correspond to the input lines 2a to 2d, respectively. The time slot numbers each represents the number of the time slot in which the cell was input. The time slots showing no cells are the time slots in which no cell was received or in which an idle cell has been output.

The cells which are input to the cell switch 11 are distributed to the specified output line numbers and output during the next time slot, as a general rule. If a plurality of cells which are to be delivered to the same output line are input during the same time slot, the cells are output one after another in a predetermined order. The order may be determined in various ways. In this illustrative case, a method is employed which outputs the cells according to their input line numbers in a circular order of 1→2→3 →4→. However, this method for ordering the output of the cells is merely illustrative and other approaches may be equally viable.

In the illustrative case of FIG. 5, during time slot 1, cells to be delivered to the first output line (output line 3a) arrive at the four input lines 2a to 2d. Therefore, the cells input from the input line numbers 2, 3, 4, and 1 are output during time slots 2 to 5, respectively, in consecutive order (namely, 2b→2c→2d→2a). During time slot 3, a cell is received on input line 2d. This cell is output at time slot 6 on output line 3a.

Since both of the cell switches 11 and 12 operate as described above, the order of outputting a plurality of cells which are to be delivered to the same address and which are input during the same time slot is sometimes different, depending upon the internal state of the cell switch. However, there is no time interval between the outputs of the cells. In other words, these plurality of cells are continuously output, and no idle cell is inserted between the cells.

In this embodiment, when a plurality of cells are to be output to the same output line, they are output in a circular order, as described above. The order of outputting the cells is not critical to the present invention. In an extreme case, the cells may be output at random.

Figure 6:
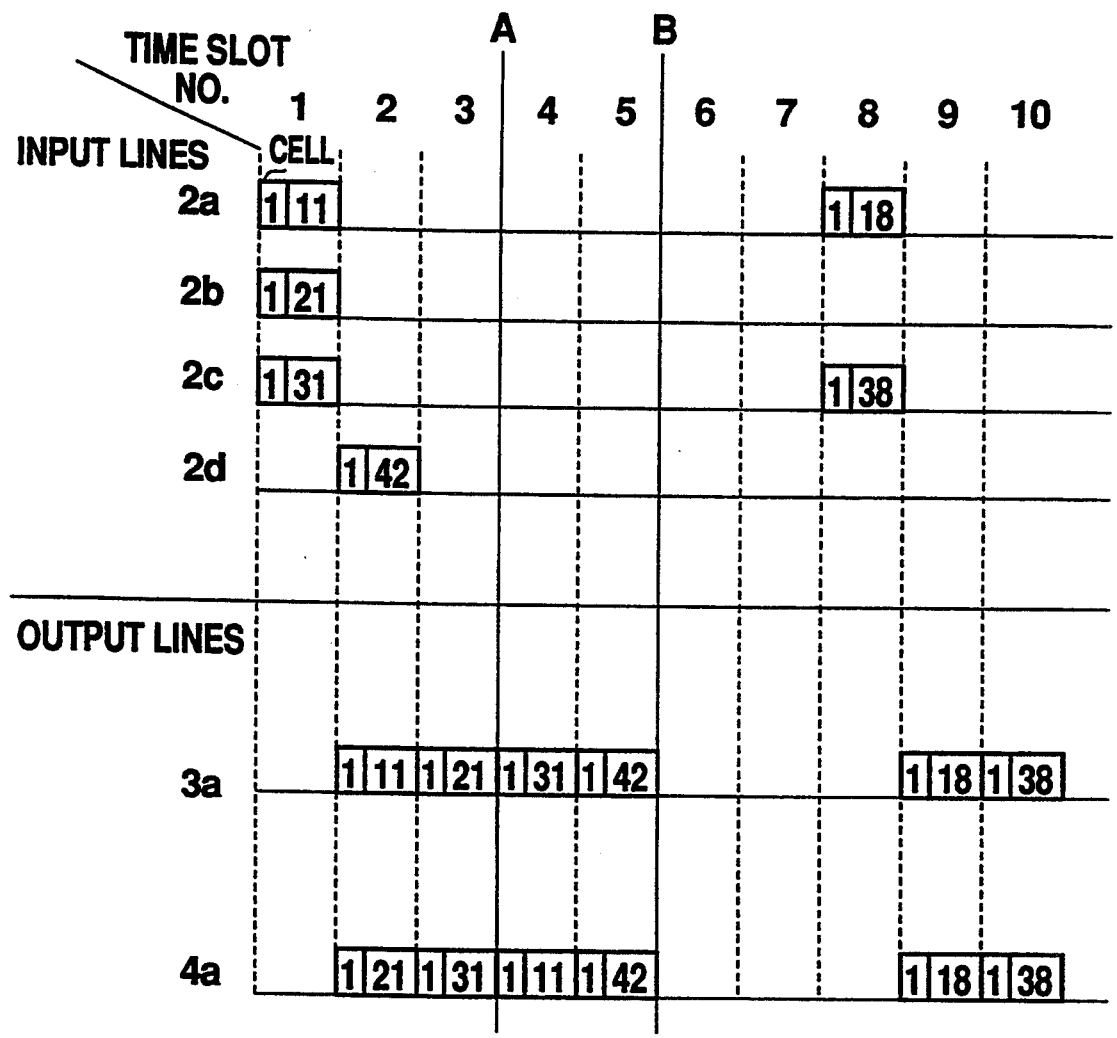
FIG. 6 is another timing diagram showing the input and output timings for the embodiment shown in FIG. 2.

The operation of the selector 5a will now be explained. The case of switching the cell switch 11, which is currently used, over to the cell switch 12 will be explained with reference to FIGS. 6 and 7. FIG. 6 is a timing chart for signals which are input from the input lines 2a to 2d and output to the output line 3a of cell switch 11 and output line 4a of cell switch 12. The input cells are exchanged by the cell switches 11 and 12 so that the cells are output to output lines 3a and 4a. In FIG. 6, the cell received on input line 2a is output to the output line 3a, whereas the cell received on input line 2b is output on the output line 4a during time slot 2.

The cell switches 11 and 12 exchange cells on the basis of the same control algorithm, but since the internal states of the cell switches 11 and 12 are not always the same, the order of outputting cells in cell switch 11 is sometimes different from the order in the cell switch 12, as shown in FIG. 6 (i.e., note the order in which the cells "111", "121", and "131" are output on output lines 3a and 4a). In this case, if a changeover to system #2 occurs at time A in FIG. 6, a cell is duplicated or missed, as shown in FIG. 7A.

However, if the changeover to system #2 occurs at time B in FIG. 6, no cell is duplicated or missed, as shown in FIG. 7B. This is because the order of outputting cells having an idle cell therebetween is not changed, as described above.

Therefore, when the selector 5a (FIG. 3) which is connected to the output lines 3a and 4a receives a system change-over signal, the selector 5a instructs the selection circuit 8 to switch after the idle cell detector 7 detects an idle cell which is output to the output lines of both systems at time B in FIG. 6. It is, thus, possible to switch systems without duplicating or missing a cell. The selectors 5a to 5m (see FIG. 2) switch the systems in this way independently of each other. Therefore, the operation of switching the systems in the entire ATM cell exchanging apparatus as a whole is completed when all the selectors 5a to 5m have finished the switching operation.

Second embodiment

Figure 8:
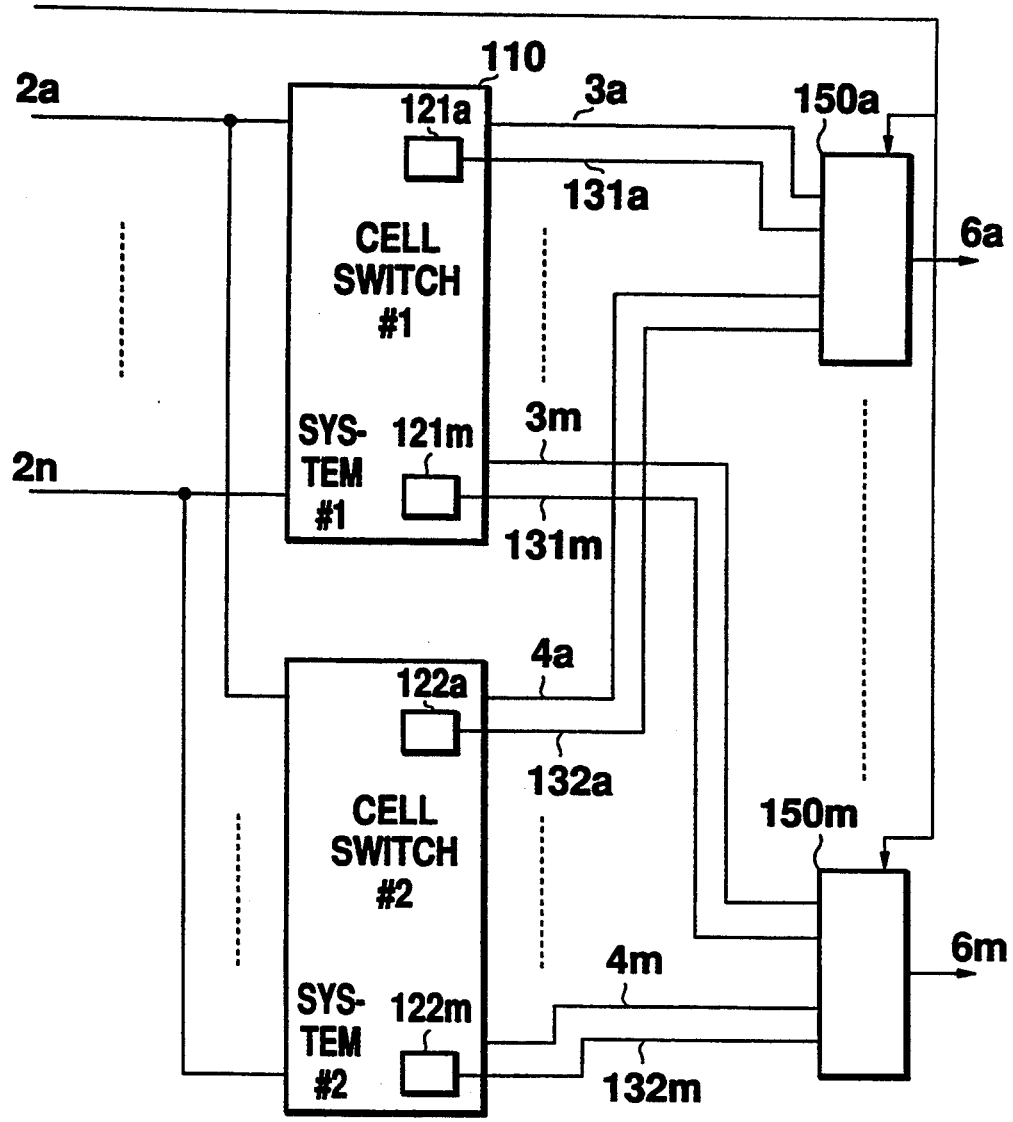
FIG. 8 is a block diagram showing the configuration of a cell exchanging apparatus according to a second embodiment of the invention.

A cell exchanging apparatus according to a second embodiment of the invention is described in conjunction with FIG. 8.

FIG. 8 is a block diagram showing the configuration of the cell exchanging apparatus according to the second embodiment of the invention, wherein 2a–2n, 3a–3m, 4a–4m, and 6a–6m are input lines and output lines, as in the first embodiment shown in FIG. 2. A cell switch 110 (#1) contains cell monitors 121a–121m; a cell switch 120 (#2) contains cell monitors 122a–122m, as a feature of the cell exchanging apparatus according to the second embodiment. Each of the cell monitors 121a–121m and 122a–122m monitors the output state of a cell to each of switch output lines 3a–3m and 4a–4m, and outputs the monitor result as a cell presence/absence signal to each of cell presence/absence signal lines 131a–131m and 132a–132m. If a cell is output, the cell presence/absence signal indicates "cell presence"; if no cell is output, the signal indicates "cell absence".

Unlike the selectors 5a–5m of the first embodiment shown in FIG. 2, selectors 150a–150m used with the second embodiment have a simplified monitor mechanism. Instead, the cell monitors 121a–121m and 122a–122m in the cell switches 110 (#1) and 120 (#2) report the monitor results to the selectors 150a–150m. That is, the selectors 150a–150m of the second embodiment do not contain an idle cell detection circuit, and selection circuits are controlled in response to the cell presence/absence signals to the selectors 150a–150m.

The operation of the cell exchanging apparatus according to the second embodiment is the same as that according to the first embodiment. In the second embodiment, after a change-over is instructed by a system change-over signal, the selectors 150a–150m are responsive to the cell presence/absence signals output by the cell monitors 121a–121m and 122a–122m for judging the timing at which an actual change-over can be performed. Entire change-over of the cell switches is completed upon termination of changing over at all the output selectors.

Idle cells are detected by the output selectors or the cell monitors in the cell switches in the first and second embodiments, but may be detected elsewhere in the cell exchanging apparatus.

Third embodiment

Figure 9:
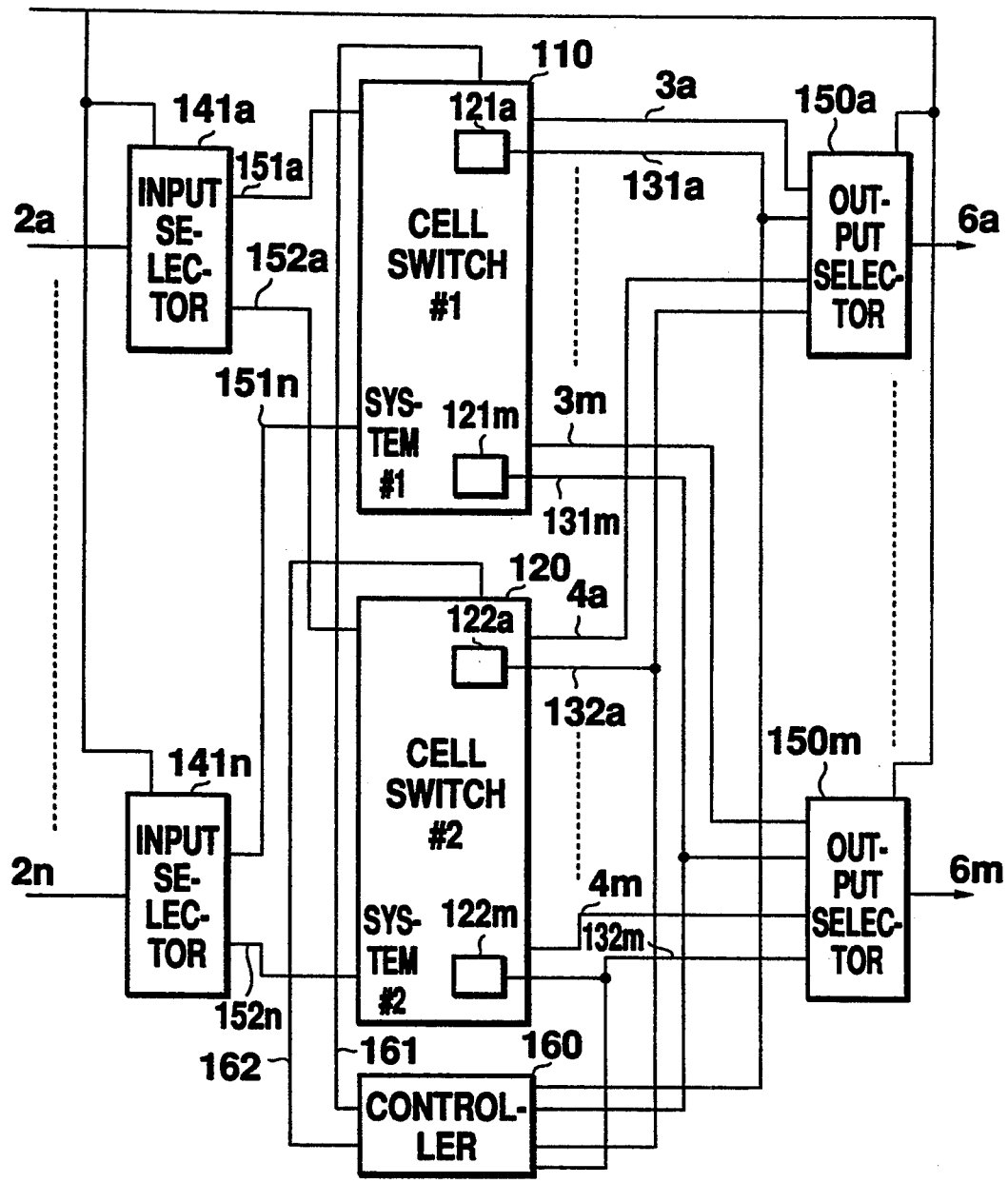
FIG. 9 is a block diagram showing the configuration of a cell exchanging apparatus according to a third embodiment of the invention.

Next, a cell exchanging apparatus according to a third embodiment of the invention is described in conjunction with FIG. 9.

FIG. 9 is a block diagram showing the configuration of the cell exchanging apparatus according to the third embodiment of the invention, wherein the cell exchanging apparatus contains cell switches 110 (#1) and 120 (#2) for exchanging input cells based on their destination information. Each of the cells consists of a header section containing an output line number as destination information and a data section containing data to be transmitted.

In the third embodiment, each of the cell switches 110 (#1) and 120 (#2) has a buffer memory for each switch output line. The buffer memory is an output buffer for once storing cells before they are output to the switch output line corresponding to the buffer memory. The cell switch having such output buffers is called an output buffer type switch. The cell switch 110 (#1) operates as an active system and the cell switch 120 (#2) operates as a standby system. Input lines 2a–2n of the cell exchanging apparatus according to the third embodiment are connected to input selectors 141a–141n respectively. Output signals of the input selectors 141a–141n are connected to 151a–151n and 152a–152n, switch input lines of the cell switches 110 (#1) and 120 (#2).

Switch output lines 3a–3m and 4a–4m, cell exchanging apparatus output lines 6a–6m, and output selectors 150a–150m are the same as those used with the second embodiment. Also, cell monitors 121a–121m and 122a–122m and cell presence/absence signal lines 131a–131m and 132a–132m are the same as those used with the second embodiment.

The cell exchanging apparatus according to the third embodiment further includes a controller 160 which grants cell output permission to the cell switch 110 (#1) or 120 (#2) for each switch output line. The output permission signals are fed on output permission signal lines 161 and 162 to the cell switches 110 (#1) and 120 (#2).

Next, the operation of the cell exchanging apparatus is described for changing over the cell switch 120 (#2) to the active system when the cell switches 110 (#1) and 120 (#2) serve as the active system and standby system respectively.

First, when the cell switch 110 (#1) serves as the active system, the controller 160 grants cell output permission to the cell switch 110 (#1). Cells arriving at the cell exchanging apparatus input lines 2a–2n are output through the input selectors 141a–141n to the switch input lines 151a–151n. Resultantly, the cells are input to the cell switch 110 (#1). The cell switch 110 (#1) performs the same operation as the cell switch 110 (#1) in the second embodiment for outputting the cells to the cell output lines 3a–3n. The cells output from the cell switch 110 are fed into the output selectors 150a–150m through which the cells are output to the cell exchanging apparatus output lines 6a–6m.

On the other hand, the cell switch 120 is in the standby mode.

In the state, if a system change-over signal is entered indicating that the cell switch serving as the active system is to be changed from cell switch 110 to 120, the following operation is started. First, the input selectors 141a–141n select the switch input lines 152a–152n. Resultantly, the cells input to the input selectors are all sent to the cell switch 120 (#2) and not sent to the cell switch 110 (#1).

The cell switch 120 (#2) performs the same processing as the cell switch 110 (#1) for the input cells except that the buffer memories of the cell switch 120 store the cells without outputting them because the cell switch 120 does not yet receive a cell output permission signal from the controller 160. Each of the buffer memories is an output buffer provided for each switch output line of the cell switches 110 (#1) and 120 (#2) for storing the cells to be output to the output line corresponding to the buffer. On the other hand, after the system change-over signal was entered, the cell switch 110 (#1) still continues to output cells to the switch output lines until the cells stored in the output buffers of the cell switch 110 are out.

Figure 10:
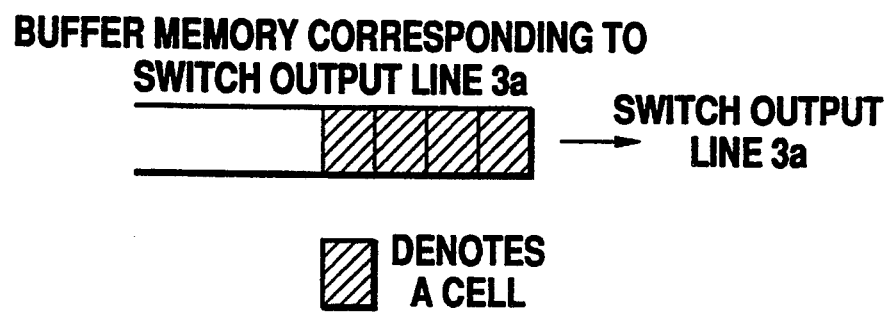
FIG. 10 is a drawing for illustrating movement of cells in a buffer when cell switches of the cell exchanging apparatus shown in FIG. 9 are changed over.
Figure 11:
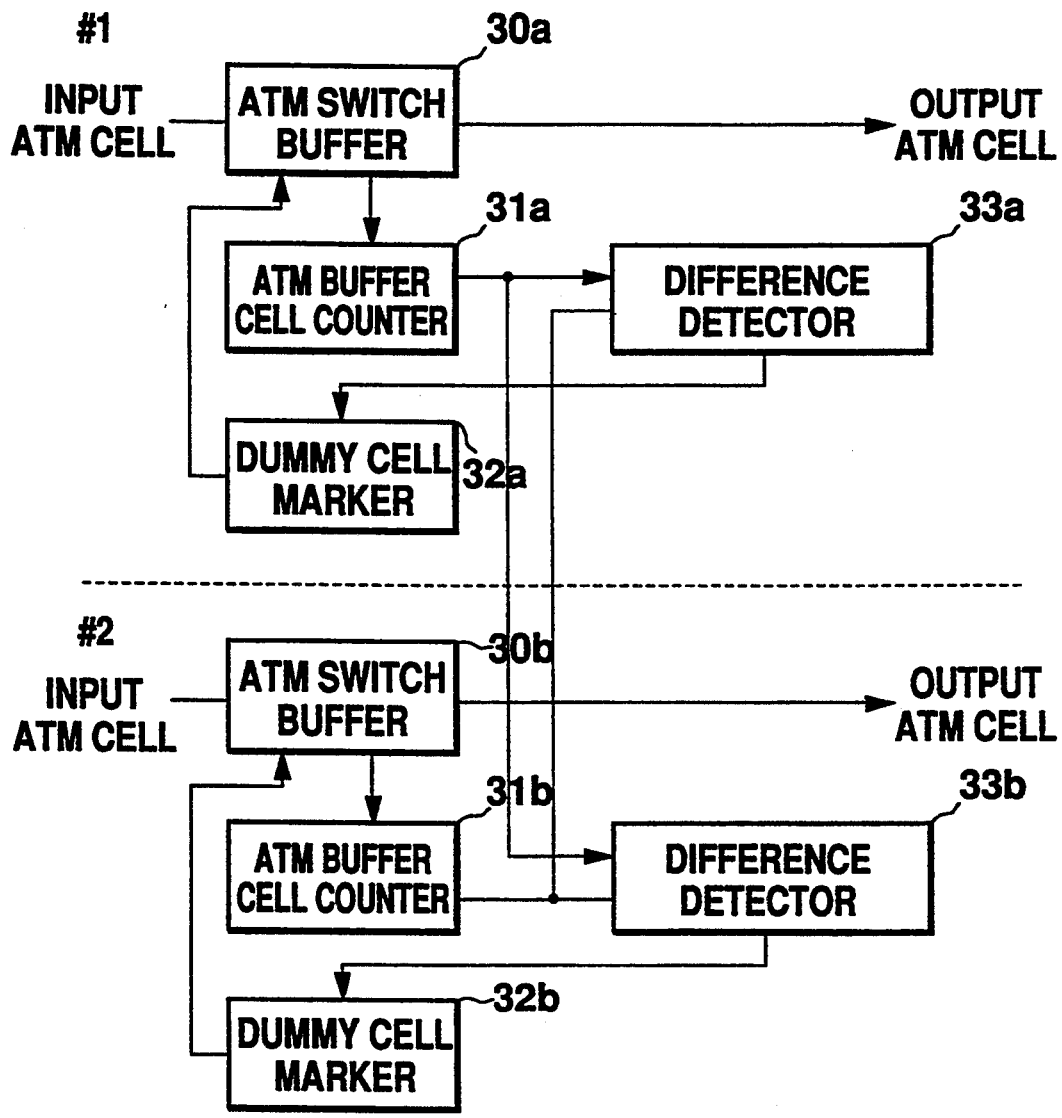
FIG. 11 is a block diagram of an example of the structure of a conventional ATM switch.
Figure 12A:
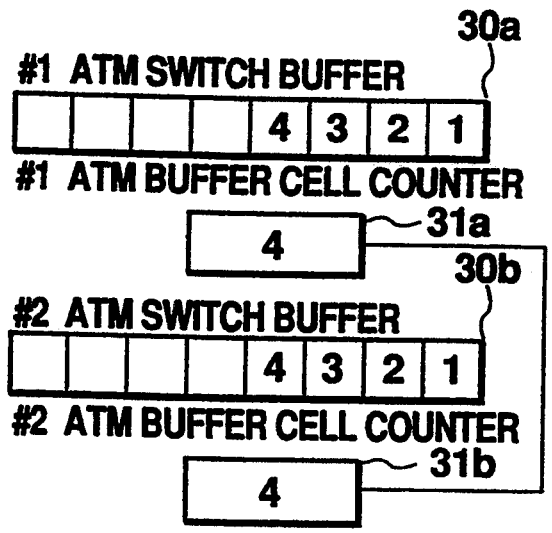
FIGS. 12A–12C are timing diagrams for explaining the operation of a conventional ATM switch.
Figure 12B:
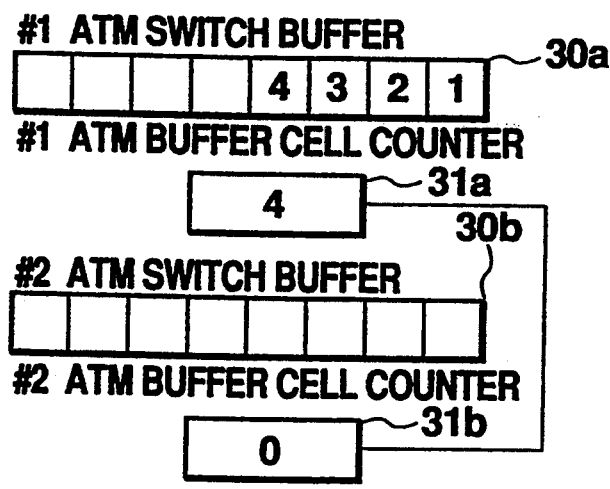
Figure 12C:
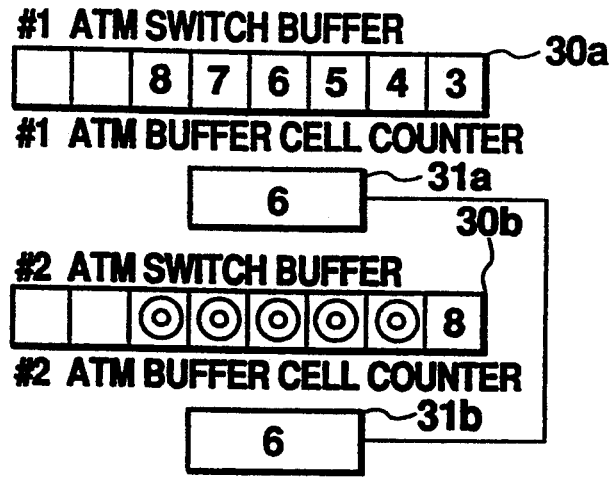
Figure 13A:
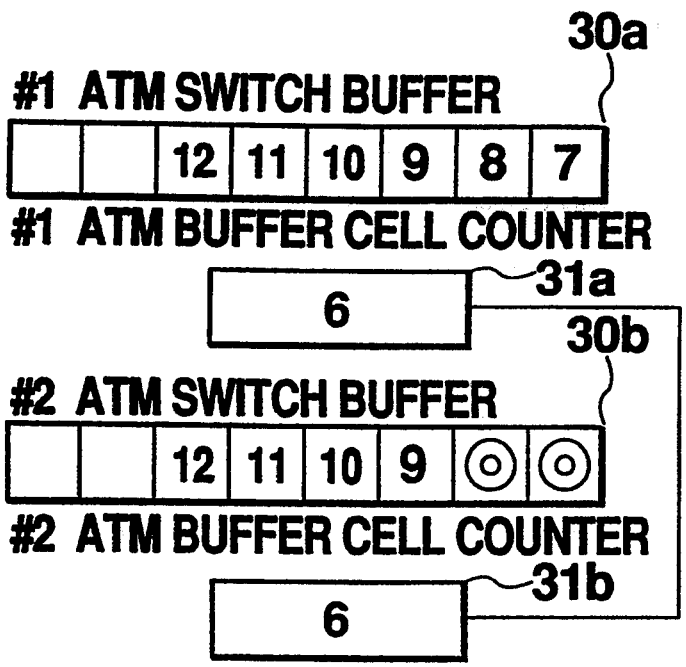
FIGS. 13A and 13B are timing diagrams for explaining the operation of a conventional ATM switch.
Figure 13B:
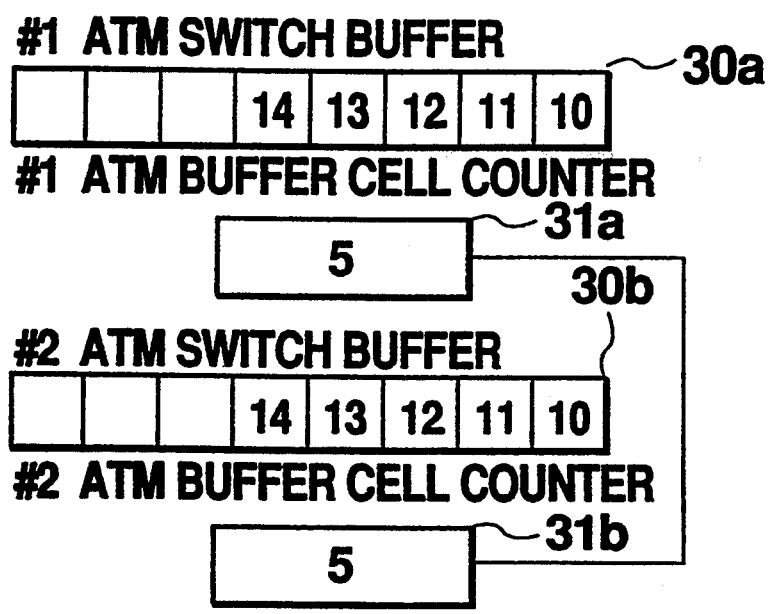

For example, when the system change-over signal is entered and feeding cells into the cell switch 120 (#2) is started, if four cells are stored in the buffer memory corresponding to the switch output line 3a of the cell switch 110 (#1) as shown in FIG. 10, the cell switch 110 (#1) outputs the cells in sequence. On the other hand, the cells which are input to the cell switch 120 (#2) for output to the switch output line 4a are stored in the buffer memory corresponding to the output line 4a.

When all the cells stored in the cell switch 110 (#1) have been output, the cell presence/absence signal output through the cell presence/absence signal line 131a is set to a value representing "cell absence" for informing the output selector 150a and the controller 160 that the cells to be output have gone. Then, the output selector 150a selects the switch output line 4a instead of the switch output line 3a and the controller 160 sends a cell output permission signal to the cell switch 120 (#2) on the cell output permission signal line 162 for enabling the cells to be output through the switch output line 4a. Resultantly, the cell switch 120 (#2) starts to output the cells over the switch output line 4a.

Thus, a change-over is made for each switch output line in sequence, and entire change-over of the cell switches is completed upon termination of changing over all the switch output lines.

Fourth embodiment

The third embodiment uses so-called output buffer type ATM switches having a buffer memory for each switch output line as the cell switches 110 (#1) and 120 (#2).

However, it is also preferable that the cell switch contains a buffer memory shared by the switch output lines. In this case, the cell switch can be operated like the output buffer type ATM switch by managing the addresses of the buffer memory into which cells are written. The cell switch having such a shared buffer memory is called a "shared buffer type ATM cell switch."

When the shared buffer type ATM cell switch is used, the cell presence/absence monitor function monitors the buffer memory addresses managed for each output line.

Fifth embodiment

The second embodiment uses so-called output buffer type ATM switches for the cell switches.

However, use of the "shared buffer type ATM cell switches" is also preferable, as in the fourth embodiment.

What is claimed is:

1. An asynchronous transfer mode cell exchanging apparatus for inputting cells through n input lines, each cell having a data section containing data to be transmitted and a header section containing destination information, and for distributing the cells by destination for outputting to m output lines, wherein n and m are positive integers, said cell exchanging apparatus comprising:

a) first switch means for distributing cells input through said n input lines by destination in response to said destination information and for directing the cells to a first group of m switch output lines, said first switch means including means for outputting idle cells to said first group of switch output lines when there are no cells to be output, said first switch means comprising:

a1) a first group of m output buffers which temporarily store the distributed cells by destination; and a2) a first group of m cell monitors, each being provided for each of said first group of m switch output lines, for determining which of a normal cell and an idle cell is output to its corresponding switch output line and outputting a cell presence/absence signal specifying whether a normal cell exists;

b) second switch means for distributing cells input through said n input lines by destination in response to said destination information and for directing the cells to a second group of m switch output lines, said second switch means including means for outputting idle cells to said second group of switch output lines when there are no cells to be output, said second switch means comprising:

b1) a second group of m output buffers which temporarily store the distributed cells by destination; and b2) a second group of m cell monitors, each being provided for each of said second group of m switch output lines, for determining which of a normal cell and an idle cell is output to its corresponding switch output line and outputting a cell presence/absence signal specifying whether a normal cell exists; and c) m output selectors each being provided for one of said output lines for selecting a switch output line of a corresponding pair of lines of said first group and said second group of m switch output lines in response to a change-over signal, to send cells output through the selected switch output line to the corresponding output line, each of said output selectors including output selector control means for monitoring the cell presence/absence signal output by said cell monitor provided corresponding to said switch output line of the group selected by said output selector to change over said switch output line in response to the change-over signal only if said cell presence/absence signal indicates cell absence.

2. An asynchronous transfer mode cell exchanging apparatus for inputting cells through n input lines, each cell having a data section containing data to be transmitted and a header section containing destination information and for distributing the cells by destination for outputting to m output lines, wherein n and m are positive integers, said cell exchanging apparatus comprising:

a) input selectors being responsive to a change-over signal for directing cells input through said n input lines to one of a first and a second group of n switch input lines;

b) first switch means for distributing cells input through said first group of n switch input lines by destination in response to said destination information and for directing the cells to a first group of m switch output lines, said first switch means including means for outputting idle cells to said first group of switch output lines when there are no cells to be output, said first switch means comprising:

b1) a first group of m output buffers which temporarily store the distributed cells by destination; and b2) a first group of m cell monitors, each being provided for each of said first group of m switch output lines, for determining whether a cell is output to its corresponding switch output line and outputting a cell presence/absence signal specifying whether a cell exists;

c) second switch means for distributing cells input through said second group of n switch input lines by destination in response to said destination information and for directing the cells to a second group of m switch output lines, said second switch means including means for outputting idle cells to said second group of switch output lines when there are no cells to be output, said second switch means comprising:

c1) a second group of m output buffers which temporarily store the distributed cells by destination; and c2) a second group of m cell monitors, each being provided for each of said second group of m switch output lines, for determining whether a cell is output to its corresponding switch output line and outputting a cell presence/absence signal specifying whether a cell exists;

d) output selectors for selecting one of said first and second group of m switch output lines in response to a change-over signal to send cells output through the selected group of switch output lines to said output lines, each of said output selectors including:

d1) an output unit selector being provided for each of said m output lines for selecting one switch output line of a pair of switch output lines of said first and second groups and connecting the selected switch output line to the output line corresponding to said output unit selector; and d2) output selector control means for monitoring the cell presence/absence signal output by said cell monitor provided corresponding to said switch output line of the group to which said output unit selector is connected to change over said switch output line in response to the change-over signal only if said cell presence/absence signal indicates; and e) a controller, responsive to a change-over signal, for granting cell output permission only to a selected one of said first and second switch means, when presence is indicated by at least one output signal of the cell monitors provided for the selected switch means, and for granting cell output permission for the corresponding at least one output line to the other switch means when cell absence is indicated by the cell monitors of the selected switch means.

3. The cell exchanging apparatus as claimed in claim 2 wherein each of said first and second groups of output buffers is a shared buffer memory.

4. The cell exchanging apparatus as claimed in claim 1 wherein each of said first and second groups of output buffers is a shared buffer memory.

5. A packet switching apparatus for inputting a packet through n input lines, each packet having data to be transmitted and destination information, and for distributing the packet according to the destination information to one of m output lines, wherein n and m are positive integers, said packet switching apparatus comprising:

a first switch for distributing packets input through said n input lines to a first group of m switch output lines in response to said destination information, said first switch including means for monitoring whether there are packets in the switch to be output to the switch output lines and for outputting a signal specifying whether there are such packets;

a second switch for distributing packets input through said n input lines to a second group of m switch output lines in response to said destination information, said second switch including means for monitoring whether there are packets in the switch to be output to the switch output lines and for outputting a signal specifying whether there are such packets; and output selectors, each being connected to one of said output lines and to a corresponding pair of switch output lines of said first group and said second group, each output selector selecting the switch output line of the first group to output packets to the output line connected thereto and, in response to a change-over signal, monitoring the signal output by the monitor provided for the switch output line of the first group and selecting the switch output line of the second group to output packets to the output line when the monitored signal indicates that no packets are to be output on the switch output line of the first group.

6. The packet switching apparatus of claim 5, wherein said means for monitoring and outputting a signal comprise:
   a) means for outputting an idle packet to any of said switch output lines of the first group when there are no packets to be output to the switch output line; and
   b) a first group of m monitors, each being provided for a corresponding one of said switch output lines of said first group, for detecting whether an idle packet is output to the corresponding switch output line and for outputting a signal specifying whether an idle packet is output.

7. The packet switching apparatus as claimed in claim 5 wherein each of said first and second switches comprises a group of output buffers in which packets are temporarily stored before being output to the switch output lines.

8. The packet switching apparatus of claim 7, wherein the group of output buffers is a shared buffer memory.

9. A packet switching apparatus for inputting a packet through n input lines, each packet having data to be transmitted and destination information, and for distributing the packet according to the destination information to one of m output lines, wherein n and m are positive integers, said packet switching apparatus comprising:
   a) input selectors being responsive to a change-over signal for directing packets input through said n input lines to one of a first and a second group of n switch input lines;
   b) a first switch for distributing packets input through said first group of n switch input lines to a first group of m switch output lines in response to said destination information, said first switch comprising:
      b1) means for outputting an idle packet to any of said switch output lines of the first group when there are no packets to be output to the switch output line; and
      b2) a first group of m monitors, each being provided for a corresponding one of said switch output lines of said first group, for detecting whether an idle packet is output to the corresponding switch output line and for outputting a signal specifying whether an idle packet is output;
   c) a second switch for distributing packets input through said second group n switch input lines to a second group of m switch output lines in response to said destination information, said second switch comprising:
      c1) means for outputting an idle packet to any of the switch output lines of the second group when there are no packets to be output to the switch output line; and
      c2) a second group of m monitors, each being provided for a corresponding one of said switch output lines of said second group, for detecting whether an idle packet is output to the corresponding switch output line and for outputting a signal specifying whether an idle packet is output;
   d) output selectors, each being connected to one of said output lines and to a corresponding pair of switch output lines from said first and second group of switch output lines, each of said output selectors selecting the switch output line of the first group to output packets to the output line connected thereto and, in response to the change-over signal, monitoring the signal output by the monitor provided for said switch output line of the first group and selecting said switch output line of the second group to output packets to the output line connected thereto when the signal from the monitor specifies that an idle packet is output on the switch output line of the first group; and
   e) a controller for granting packet output permission to the first switch, and responsive to the change-over signal, for monitoring the signal output by each monitor of the first switch and for granting packet output permission to the second switch when the signal from all monitors of the first switch indicate that idle packets are being output on all switch output lines of the first switch.

10. The packet switching apparatus of claim 9, wherein the first and second switch each include a group of output buffers in which packets are temporarily stored before being output to the switch output lines.

11. The packet switching apparatus as claimed in claim 10 wherein said group of output buffers is a shared buffer memory.

12. In a packet switching system including a first switch having n switch input lines and m switch output lines and a second switch having n switch input lines and m switch output lines corresponding to the switch input and output lines of the first switch, wherein n and m are positive integers wherein the first switch is an active switch for distributing packets received from n input lines corresponding to said switch input lines to m output lines corresponding to said switch output lines and the second switch is a standby switch, a method for making the second switch the active switch and the first switch the standby switch comprising the steps of:
   generating a change-over signal indicating that the second switch is to be the active switch;
   detecting that no packets are to be output on the switch output lines of the first switch;
   selecting the second switch as the active switch in response to a detection that no packets are to be output to the switch output lines of the first switch.

13. The method of claim 12 further comprising the steps of:
   inputting packets to switch input lines of only the second switch after receipt of the change-over signal; and
   preventing output of packets from switch output lines of the second switch until the second switch is selected as the active switch.

14. The method of claim 13 further comprising the step of allowing output of packets to the output lines by only the second switch after idle packets are detected on all switch output lines of the first switch.

15. The method of claim 12, wherein the first switch includes means for generating, for each switch output line, an idle packet on the switch output line when there are no packets to be output to the switch output line, wherein the step of detecting comprises the step of:

detecting that an idle packet is present on a switch output line of the first switch; and switching output selection to the corresponding switch output line of the second switch in response to a detection that an idle packet is present on the switch output line of the first switch.

* * * * *